United States Patent [19]

Sato

[11] Patent Number: 4,630,135
[45] Date of Patent: Dec. 16, 1986

[54] VIDEO HEAD POSITION CONTROL

[75] Inventor: Fumiaki Sato, Yokohama, Japan

[73] Assignee: Victor Company of Japan, Limited, Yokohama, Japan

[21] Appl. No.: 599,293

[22] Filed: Apr. 12, 1984

[30] Foreign Application Priority Data

Apr. 14, 1983 [JP] Japan .................. 58-66009

[51] Int. Cl.⁴ .............................................. G11B 21/10
[52] U.S. Cl. .............................. 360/10.2; 310/313 A; 310/313 B; 360/77
[58] Field of Search ............ 310/313 A, 313 B; 360/10.2, DIG. 1, 109, 77, 10.3

[56] References Cited

U.S. PATENT DOCUMENTS

| | | | |
|---|---|---|---|
| 3,878,477 | 4/1975 | Dias | 310/313 B |
| 3,883,831 | 5/1975 | Williamson | 310/313 D |
| 4,080,636 | 3/1978 | Ravizza | 360/DIG. 1 |
| 4,130,813 | 12/1978 | Sandy | 310/313 D |
| 4,361,857 | 11/1982 | Sakamoto | 360/77 |
| 4,404,605 | 9/1983 | Sakamoto | 360/109 |

FOREIGN PATENT DOCUMENTS

2711976 4/1980 Fed. Rep. of Germany .

Primary Examiner—Alan Faber
Attorney, Agent, or Firm—Pollock, VandeSande & Priddy

[57] ABSTRACT

In a video head position control apparatus utilizing a bimorph element (1), one or two surface acoustic wave oscillators (13, 15) is (are) formed by using piezoelectric element(s) (3, 4) of the bimorph element (1) for measuring displacement of a video head (5) attached to tip portion of the bimorph element (1) by detecting oscillating frequency variation. The oscillating frequency is used to detect an error of the position of the video head (5) with respect to a desired position indicated by a control voltage ($V_{CI}$) which is fed from a video tape recorder such that peak voltage of the control voltage changes throughout different video tape velocity on various operating modes. The control voltage is thus corrected by an error voltage ($V_E$) so that a corrected voltage is applied to the bimorph element (1) to cause the same to accurately position the video head (5).

14 Claims, 7 Drawing Figures

VIDEO HEAD POSITION CONTROL

BACKGROUND OF THE INVENTION

This invention generally relates to apparatus for controlling the position of (a) video head(s) mounted on a rotary cylinder of video tape recorder, and more particularly, to such apparatus using a bimorph cell or element.

Amongst conventional video tape recorders, some of them are arranged such that a video head is fixed to a rotary cylinder for recording a video signal and for effecting normal playback, while another video head is additionally attached to a tip portion of a bimorph element which is fixed to the rotary head at the other end. This additional head is periodically moved in a direction normal to the plane of rotation thereof with a voltage being applied to the bimorph element so as to obtain accurate tracking on special playback, such as fast playback, slow playback, still playback, where the tape motion speed is different from that on recording.

However, since there is hysteresis in the relationship between the applied voltage and the displacement of the bimorph element, the amount of displacement cannot be simply determined by the applied voltage. Therefore, recording and normal playback cannot be effected by way of the video head attached to the bimorph element. As a result, conventional video tape recorders suffer from a drawback that four video heads in total, namely two for recording and the other two for special playback, are needed.

SUMMARY OF THE INVENTION

The present invention has been developed in order to remove the above-described drawbacks inherent to the conventional apparatus for controlling the position of video heads.

It is, therefore, an object of the present invention to provide new and useful apparatus for controlling the position of a video head, which is capable of accurately positioning the video head in accordance with a varying control voltage so that undesirable error due to hysteresis characteristic of a bimorph element carrying the video head is not resulted.

According to a feature of the present invention, at least a pair of surface acoustic wave transducers are formed on an exposed surface of a piezoelectric element forming a bimorph element, which carries a video head at its one end and is fixed to a rotary cylinder at the other end, and these transducers are connected to input and output terminals of an amplifier so as to constitute a surface acoustic wave oscillator. Since the oscillating frequency of the surface acoustic wave oscillator changes substantially in proportion to the displacement of the bimorph element, information indicative of the position of the video head can be derived by detecting the oscillating frequency. An error signal is produced by using this oscillating frequency and a control voltage given from a video tape recorder, and this error signal is used to correct the control voltage.

According to another feature of the present invention, another pair of surface acoustic wave transducers may be provided to an exposed surface of the other piezoelectric element of the bimorph element so as to constitute a second surface acoustic wave oscillator. When first and second surface acoustic wave oscillators are used, the difference in oscillating frequency therebetween is derived first, and a frequency difference signal is used to produce an error signal.

In accordance with the present invention, there is provided apparatus for controlling the position of a video head attached to a bimorph element having first and second piezoelectric elements, where said bimorph element is secured to a rotary cylinder of a video tape recorder and is arranged to bend, in a direction normal to the plane of rotation of said rotary cylinder, in receipt of a voltage, comprising: a first set of input and output surface acoustic wave transducers provided on an exposed surface of said first piezoelectric element; a first amplifier whose input and output terminals are respectively connected to said input and output transducers on said first piezoelectric element so as to constitute a first surface acoustic wave oscillator; a second set of input and output surface acoustic wave transducers provided on an exposed surface of said second piezoelectric element; a second amplifier whose input and output terminals are respectively connected to said input and output transducers on said second piezoelectric element so as to constitute a second surface acoustic wave oscillator; first means responsive to oscillating frequency signals from said first and second surface acoustic wave oscillators for producing a frequency difference signal indicative of frequency difference between said oscillating frequency signals; second means responsive to said frequency difference signal and to a control voltage generated by said video tape recorder in accordance with a selected operating mode, for producing an error signal indicative of the difference between a desired position and an actual position of said video head; third means responsive to said error signal and to said control voltage for correcting said control voltage by said error signal; and fourth means responsive to an output signal from said third means for driving said bimorph element.

In accordance with the present invention there is also provided apparatus for controlling position of a video head attached to a bimorph element having first and second piezoelectric elements, where said bimorph element is secured to a rotary cylinder of a video tape recorder and is arranged to bend, in a direction normal to the plane of rotation of said rotary cylinder, in receipt of a voltage, comprising: input and output surface acoustic wave transducers provided on an exposed surface of said first piezoelectric element; an amplifier whose input and output terminals are respectively connected to said input and output transducers on said first piezoelectric element so as to constitute a surface acoustic wave oscillator; first means responsive to oscillating frequency signal from said surface acoustic wave oscillator and to a control voltage generated by said video tape recorder in accordance with a selected operating mode, for producing an error signal indicative of the difference between a desired position and an actual position of said video head; second means responsive to said error signal and to said control voltage for correcting said control voltage by said error signal; and third means responsive to an output signal from said second means for driving said bimorph element.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
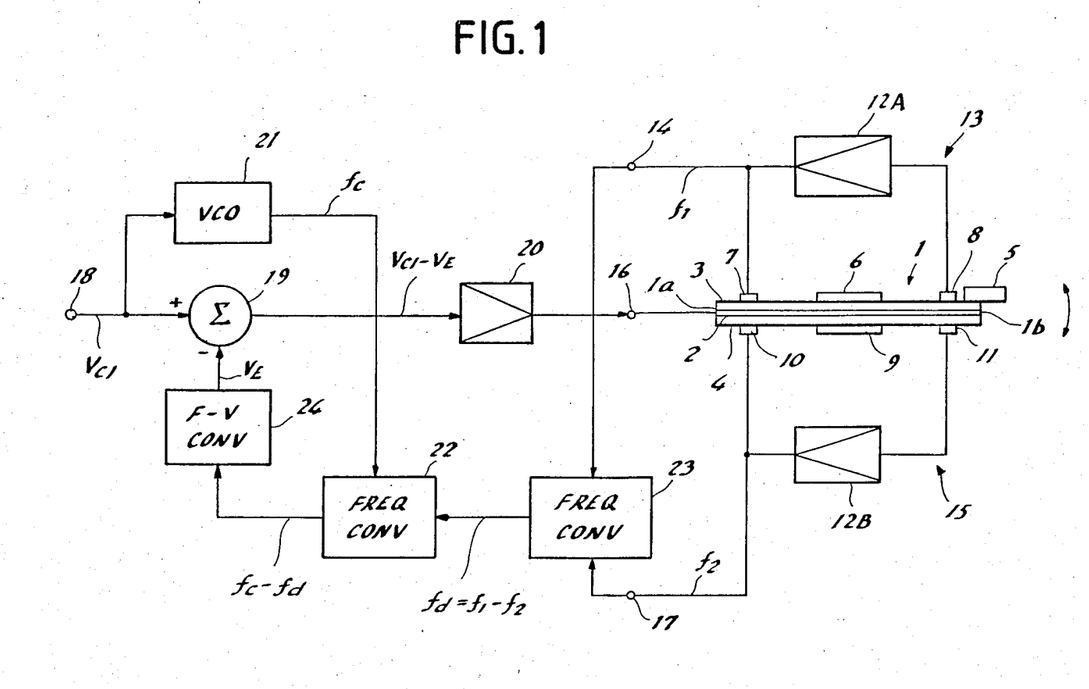
FIG. 1 is a schematic block diagram of an embodiment of the apparatus according to the present invention.

Referring to FIG. 1, a block diagram of an embodiment of an apparatus for controlling the position of a video head according to the present invention is shown. In the diagram, the reference 1 is a bimorph element or cell which is formed by sticking two plates of piezoelectric elements 3 and 4 polarizing in opposite directions on both sides of a metal plate electrode 2 which will be referred to as a center electrode hereinafter. An input terminal 16 for applying a voltage, which is used to bend the bimorph element 1, is connected to the center electrode 2. One end 1a of the bimorph, element 1 is fixed to a rotary cylinder (not shown) of a video tape recorder, while a video magnetic head 5 is attached to the other end 1b of the bimorph element 1. These two piezoelectric elements 3 and 4 will be referred to as upper and lower piezoelectric elements respectively hereinafter. The bimorph element 1 is bendable such that the video head 5 is moved upwardly and downwardly in FIG. 1 as indicated by an arrowed line.

Figure 2:
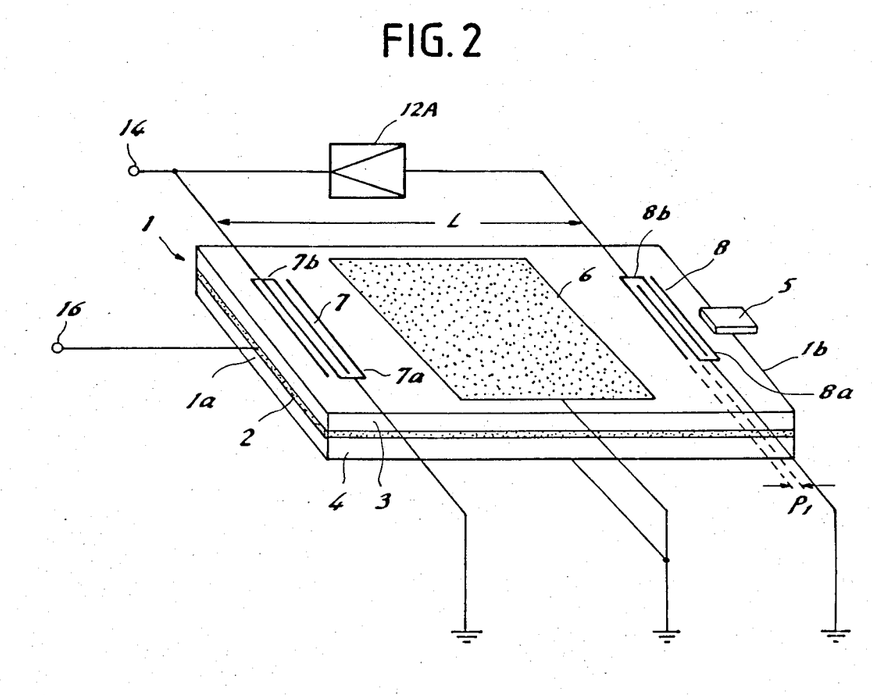
FIG. 2 is a perspective view showing the bimorph element used in the present invention.

Two rectangular electrodes 6 and 9 are respectively attached to exposed surfaces, at about the middle thereof, of the upper and lower piezoelectric elements 3 and 4 as shown in FIGS. 1 and 2. These electrodes 6 and 9, which will be referred to as side electrodes, are both grounded so that a voltage will be applied across the center electrode 2 and the side electrodes 6 and 9 as will be described hereinafter. The above-described structure of the bimorph element 1 is substantially the same as conventional bimorph element 1 used for position control of a video head. The bimorph element 1 used in the embodiment of the present invention also comprises a pair of surface acoustic wave transducers on each exposed surface of the piezoelectric elements 3 and 4. In detail, a first pair of transducers 7 and 8 are disposed on the upper surface of the upper piezoelectric element 3, while a second pair of transducers 10 and 11 are disposed on the lower surface of the lower piezoelectric element 4. Each of these transducers 7, 8, 10 and 11 has inter-digital structure as is well known in surface acoustic wave device art. Namely, these transducers may be formed on the exposed surface of each of the piezoelectric elements 3 and 4 by conventional depositing techniques as disclosed in U.S. Pat. Nos. 4,130,813 and 3,883,831. The transducers 8 and 11 positioned close to the video head 5 are used as input transducers, while the other transducers 7 and 10 positioned close to the other end 1a, where the bimorph element 1 is fixed to the rotary cylinder, are used as output transducers. However, the transducers 8 and 11 may be used as output transducers while the transducers 7 and 10 may be used as input transducers since the structure of these transducers 7, 8, 10 and 11 is identical.

Figure 3:
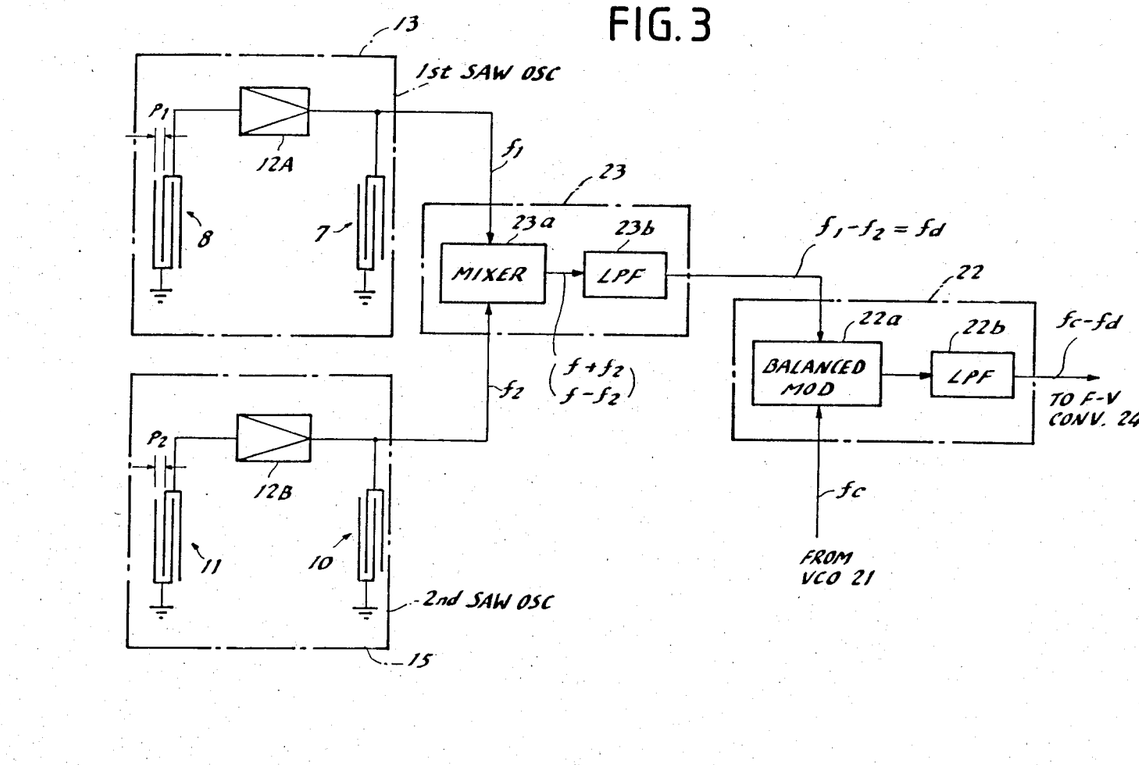
FIG. 3 is a block diagram showing the embodiment of FIG. 1 in detail.

Each of the transducers 7, 8, 10 and 11 comprises first and second U-shaped electrodes 7a and 7b, 8a and 8b each having parallel fingers, and one electrode of each transducer is grounded, while the other electrode is used as either an input or output terminal. Namely, the electrode 7b of the input transducer 7 is connected to an output terminal of an amplifier 12A, while the electrode 8b of the output transducer 8 is connected to an input terminal of the amplifier 12A as shown in FIG. 2. Similarly, the other input and output transducers 10 and 11 deposited on the lower piezoelectric element 4 are connected to another amplifier 12B as seen in FIG. 3 showing partially the embodiment of FIG. 1 in detail. Since the arrangement of these transducers 7 and 8 on the upper piezoelectric element 3 is substantially identical with that of those on the lower piezoelectric element 4, the following description as to transducers will be made in connection with only those 7 and 8 on the upper piezoelectric element 3.

The fingers of the input transducer 7 are arranged to be parallel to the fingers of the output transducer 8 so that surface acoustic wave emitted from the input transducer 7 will be effectively received by the output transducer 8 after propagation along the surface of the piezoelectric element 3. The input and output transducers 7 and 8 and the upper piezoelectric element 3, which is used as a substrate, constitute a surface acoustic wave (SAW) device, which functions as a resonator. The SAW resonator is connected across the input and output of the amplifier 12A so as to function as a positive feedback path. As a result, the combination of the SAW resonator and the amplifier 12A constitutes a SAW oscillator 13 as clearly seen in FIG. 3. Similarly, another SAW oscillator 5 is formed of input and output transducers 10 and 11, the lower piezoelectric element 4, and an amplifier 12B.

The resonating frequencies of these SAW resonators, which determine oscillating frequencies of the first and second SAW oscillators 13 and 15, are determined as follows.

In the illustrated embodiment, the inter-digital transducers 7, 8 and 10, 11 respectively have finger pitches P1 and P2 of 15 $\mu$m and 15.15 $\mu$m for instance. The distance L between the input and output transducers 7 and 8 is equal to that between the input and output transducers 10 and 11. Assuming that the distance L between the input and output transducers 7 and 8 as well as 10 and 11 is 15 mm, and the propagation velocity of surface acoustic waves is $3 \times 10^3$ m/sec, the wavelengths $\lambda_1$ and $\lambda_2$ of the surface acoustic waves on the piezoelectric elements 3 and 4 are respectively 30 $\mu$m and 30.3 $\mu$m. As a result the oscillating frequencies f1 and f2 of the SAW oscillators 13 and 15 at the time that the bimorph element 1 is not bent, are determined as 100 MHz and 99 MHz respectively. These oscillating frequencies are center or standard frequencies fo, and are changed as the bimorph element 1 is bent. When a positive voltage is applied via the input terminal 16 to the bimorph element 1 to cause the same to bend, the video head 5 is moved upwardly in FIG. 1 for instance. Due to the displacement of the bimorph element 1, the elastic constant and the density of the piezoelectric elements 3 and 4 a respectively vary, and furthermore the pitches P1 and P2 and the distance L vary resulting in an increase in the oscillating frequency f1 of the first SAW oscillator 13 by Δf, and in a decrease in the oscillating frequency f2 of the second SAW oscillator 15 by Δf. In the above, assuming that the frequency ratio Δf/fo at the time that the applied voltage is 1 V, is $0.5 \times 10^{-6}$, the oscillating frequencies of the SAW oscillators 13 and 15 vary approximately +50 Hz per 1 V, and oscillating frequency difference between the SAW oscillators 13 and 15 is approximately 1M+100 Hz. In addition, the bimorph element 1 is bent to cause 1 μm displacement of the video head 5 for instance, with respect to an applied voltage of 1 V.

Figure 4:
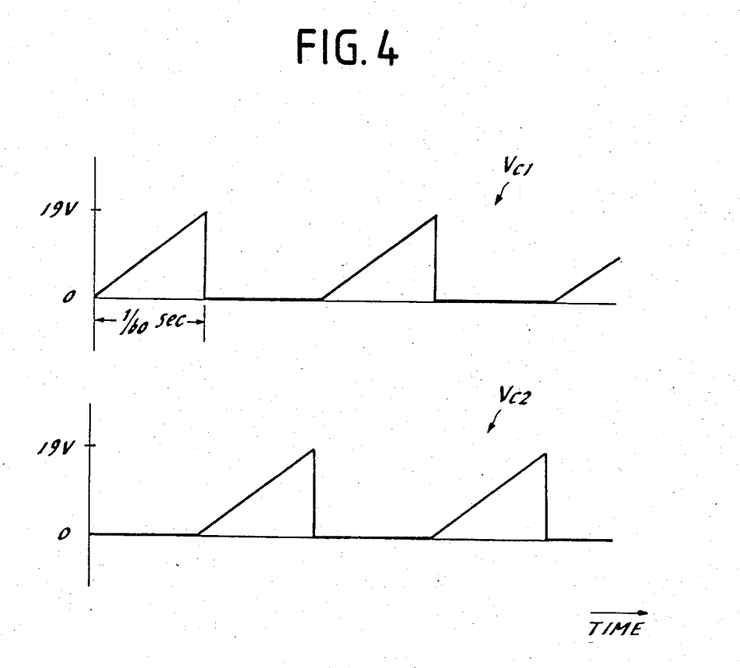
FIG. 4 is a waveform chart showing a pair of control voltages applied to the apparatus according to the present invention.

In order to control the position of the video head 5 attached to the tip portion or one end 1b, i.e. right end in FIGS. 1 and 2, of the bimorph element 1, so that the video head 5 accurately traces and scans previously formed tracks on a video tape irrespective of the change in the relative speed between the video head 5 and the video tape, a varying control voltage produced in the same manner as in conventional circuit arrangement is applied to the input terminal 16. Namely, a sawtooth wave signal generator is driven so as to produce a sawtooth wave signal having a predetermined period and peak voltage. In conventional apparatus, two video heads, which are employed in addition to record/normal playback heads, are position controlled as is known, and therefore, two sawtooh wave signals are respectively applied to two bimorph elements each carrying a video head at its tip portion. Such two sawtooth wave signals having opposite phase may be used as control signals as shown in FIG. 4. For instance, in still playback mode, the video head 5 must be raised from its normal position by 19 μm when the rotary cylinder rotates 180 degrees in which the video head 5 scans a single track entirely, assuming that the track width is 19 μm. Therefore, if the bimorph element 1 has a voltage-to-displacement characteristic of 1 m per 1 V, it is necessary to apply a control voltage whose peak is 19 V. As is well known in the art, since each video head scans a video tape during its 180 degrees rotation, when one video head is scanning, the other video head located opposite thereto with respect to the axis of the rotary cylinder is not used for scanning. The other video head is moved in a direction opposite to that in previous 180 degrees rotation immediatetly after each scanning. Namely, in the case that the video head 5 has been raised as described in the above during scanning, the video head 5 is then lowered with the control voltage being lowered. At this time the other video head (not shown) is scanning an adjacent track with the position thereof being raised in accordance with substantially linearly increasing control voltage (see $V_{C2}$ in FIG. 4).

The peak voltage of the control voltages $V_{C1}$ and $V_{C2}$ determines the amount of displacement of the video heads, and therefore the peak voltage is changed in accordance with a selected playback mode, such as still mode, search mode, etc. Namely, the peak voltage is determined depending on tape velocity ratio with respect to recording/normal playback tape velocity.

Since the structure of the other bimorph element as well as associated circuits for the other video head is substantially the same as that described in the above, the operation of the embodiment will be described in connection with a single vide head hereinbelow. One of the control voltages $V_{C1}$ and $V_{C2}$ is applied via a control signal input terminal 18 to the circuitry of FIG. 1. This control voltage $V_{C1}$ is branched off to two, one of them being fed via a subtractor 19 to an amplifier 20 to be amplified therein and is then applied via the input terminal 16 to the bimorph element 1. The other is applied to a voltage-controlled oscillator (which will be referred to as VCO) 21. The VCO 21 changes its output signal frequency in accordance with the control voltage $V_{C1}$ so as to generate a signal having a frequency fc. The frequency fc is slightly different from a frequency which would be obtained by a frequency converter 23 if the bimorph element 1 had no hysteresic characteristic. In the present embodiment, fc is higher than the above-mentioned frequency by 10 KHz.

The oscillating frequency signals f1 and f2 from the above-mentioned SAW oscillators 13 and 15 are respectively fed to the frequency converter 23. The frequency converter 23 subtracts the oscillating frequency f2 of the second SAW oscillator 15 from the oscillating frequency f1 of the first SAW oscillator 13 to obtain a frequency difference signal f1−f2 which will be fed to another frequency converter 22. The frequency converter 22 subtracts the frequency fd=f1−f2 of the output signal of the frequency converter 23 from the frequency fc of the output signal of the VCO 21 so that another frequency difference signal fc−fd will be derived. The output signal from the frequency converter 22 is converted into an error voltage $V_E$ corresponding to its input frequency by way of a frequency-to-voltage (F-V) converter 24, and the error voltage $V_E$ is then fed to the subtractor 19. The subtractor 19 subtracts the error voltage $V_E$ from the control voltage $V_{C1}$ to supply the amplifier 20 with a voltage difference signal $V_{C1}-V_E$. The subtractor 19 may be actualized by an operational amplifier and resistors as is well known in the art.

In the case that the video head 5 is needed to be moved by 10 μm upwardly in FIG. 1, if the control voltage $V_{C1}$ is 1 V, the control voltage $V_{C1}$ is multiplied by 10 by the amplifier 20, and is then applied to the bimorph 1 element, while the frequency fc of the output signal from the VCO 21 is 1010 KHz when the control voltage $V_{C1}$ is 0 V for instance, and the output signal frequency fc is 1011 KHz in correspondence with 1 V. At this time, if the video head 5 is moved upwardly by 9 μm, the frequency fd of the output signal of the frequency converter 23 is 1000.9 KHz, while the frequency fc of the output signal of the frequency converter 22 is 10.1 KHz. The F-V converter 24 is arranged, for instance, to make an error voltage $V_E$ of 0 V when 10 KHz signal is supplied thereto, and an error voltage $V_E$ of −0.1 V in response to a signal of 10.1 KHz. Therefore, the voltage outputted from the subtractor 19 becomes 1.1 V, and is applied to the bimorph element 1 after amplified by the amplifier 20. As a result, the video head 5 is caused to move upwardly by 10 μm per 1 V of the control voltage $V_{C1}$.

In this way, it is possible to move the video head 5 by an amount of displacement simply determined by the control voltage $V_{C1}$ irrespective of the hysteresis of the bimorph element 1. Consequently, the video head 5 attached to the bimorph element 1 is now capable of recording a video signal and normal reproducing, thus recording video heads fixed to the rotary cylinder in the prior art are not necessary anymore. Furthermore, since the SAW oscillators 13 and 15 are respectively provided to the piezoelectric elements 3 and 4 for detecting the amount of displacement from the difference in frequency therefrom, the sensitivity is doubled when compared to an arrangement having only one of the SAW oscillators 13 and 15. Furthermore, change in propagation velocity of the surface acoustic waves due to secular change and temperature change, does not give undesirable influence.

The above-described frequency converters 23 and 22 of FIG. 1 will be further described in detail with reference to FIG. 3. The frequency converter 23 comprises a diode mixer 23a and a low pass filter 23b, while the other frequency converter 22 comprises a balanced modulator 22a and a low pass filter 22b. The diode mixer 23a, which is widely used in television art, produces a sum signal f1+f2 and a difference signal f1−f2 and only the difference signal f1−f2 is transmitted through the low pass filter 23b. Similarly, the balanced modulator 22a of the frequency converter 22 produces a sum signal and a difference signal, and only the difference signal is transmitted through the low pass filter 22b. As the balanced modulator 22a may be used an IC known as AN6040 manufactured by Matsushita. As a variation of the above-described embodiment, an adder may be used in place of the subtractor 19 when the F-V converter 24 has a characteristic opposite to the above emobodiment, namely, if the F-V converter produces an error voltage $V_E$ of $+0.1$ V when the input frequency is 10.1 KHz.

Figure 5:
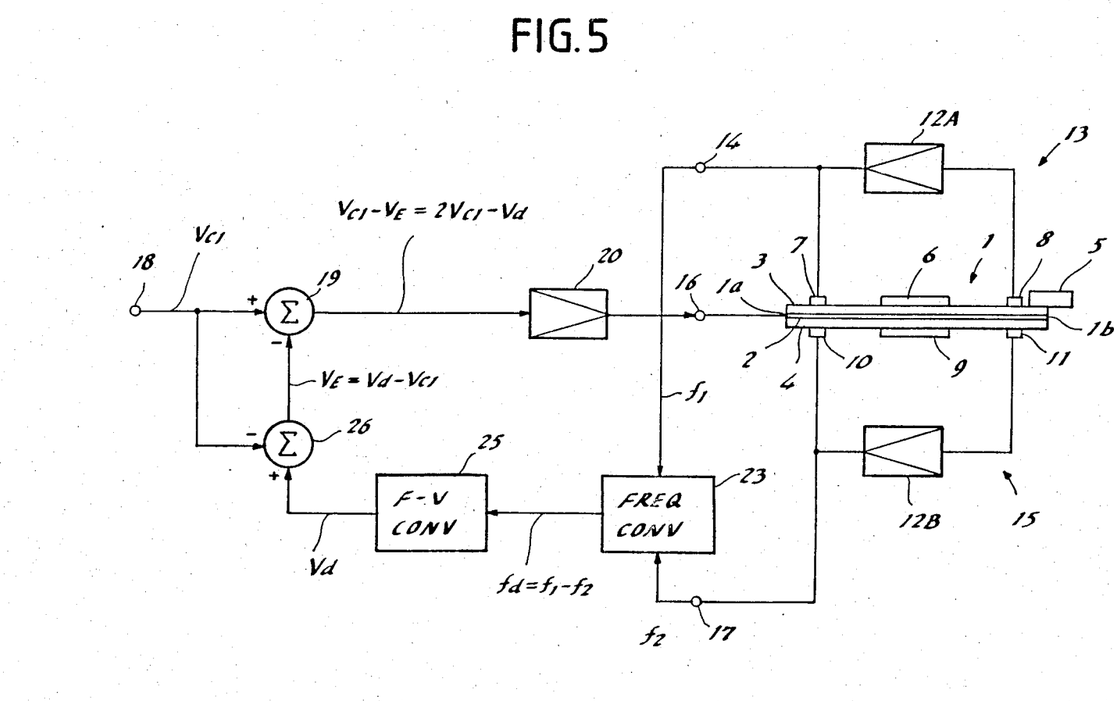
FIGS. 5, 6 and 7 are schematic block diagrams showing another embodiment of the apparatus according to the present invention.

FIG. 5 shows a block diagram of a second embodiment of the present invention apparatus. In FIG. 5, the frequency difference signal outputted from the frequency converter 23 is fed to an F-V converter 25 to be converted into a displacement voltage $V_d$ corresponding to its input frequency such that 1 MHz corresponds to 0 V and 1000.9 KHz corresponds to 0.9 V, and this voltage $V_d$ is fed to a subtractor 26. To this subtractor 26 is fed the control voltage $V_{C1}$ from the input terminal 18, and thus the subtractor 26 subtracts the control voltage $V_{C1}$ from the displacement voltage $V_d$ to derive an error voltage $V_E$ which will be fed to the subtractor 19. In the apparatus shown in FIG. 5, the output voltage from the subtractor 19 is the same as that in the apparatus of FIG. 1, and the operation thereof is also the same. Namely, the subtractor 19 subtracts the error voltage $V_E$ from the control voltage $V_{C1}$ for producing an output voltage $2V_{C1}-V_d$. Therefore, the two subtractors 26 and 19 may be actualized by a single subtractor including an operational amplifier and resistors.

In the above embodiments, although two SAW oscillators 13 and 15 are employed to derive a frequency difference therebetween, one of them may be omitted such that the oscillating frequency f1 of the single SAW oscillator 13 is used to produce an error voltage $V_E$.

Figure 6:
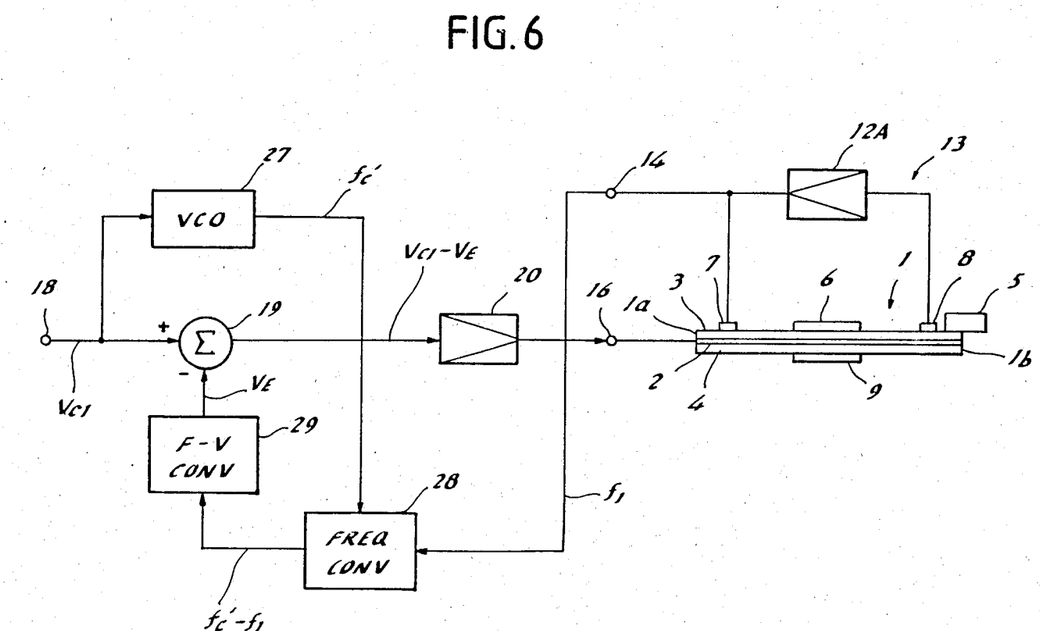

Hence, reference is now made to FIG. 6 showing another embodiment having a single SAW oscillator 13. In this embodiment, a frequency converter 28 having the same structure as the frequency converter 23 shown in FIG. 3 is used to derive a frequency difference signal between the oscillating frequency f1 from the SAW oscillator 13 and an output frequency from a voltage-controlled oscillator (VCO) 27. This VCO 27 is arranged to produce an output signal having a frequency fc' of 100.010 MHz when the control voltage $V_{C1}$ is 0 V, and 100.0105 MHz when 1 V. Therefore, the frequency converter 28 of FIG. 6 produces a frequency difference signal fc'−f1 which is then converted into a corresponding voltage to be used as an error voltage $V_E$. Namely, the frequency difference signal from the frequency converter 28 is processed by an F-V converter 29 and the subtractor 19 in the same manner as in FIG. 1. The F-V converter 29 has frequency-to-voltage conversion characteristic such that an output voltage is 0 V when its input frequency equals 10 KHz, and −0.1 V when the frequency is 10.05 KHz. As a result, the embodiment of FIG. 6 is capable of causing the displacement of the video head 5 in correspondence with the control voltage $V_{C1}$ in a manner similar to previous embodiments without being influenced by the hysteresis characteristic of the bimorph element 1. Furthermore, the apparatus shown in FIG. 6 may also be constructed so as to obtain an error voltage $V_E$ by voltage comparison rather than frequency comparison in the same manner as in the apparatus shown in FIG. 5, and is not limited to the above-described embodiment.

Figure 7:
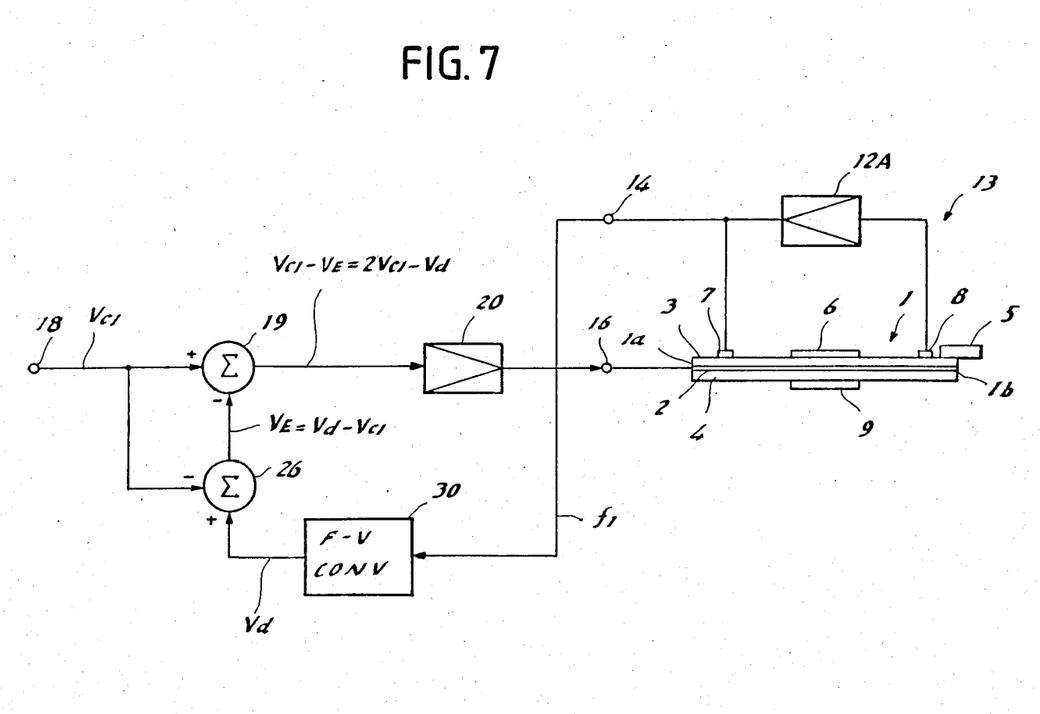

FIG. 7 shows such a modification of the arrangement of FIG. 6. Namely, the oscillating frequency f1 from the SAW oscillator 13 is fed to an F-V converter 30 to be converted into a voltage $V_d$, and this voltage $V_d$ is processed in the same manner as in FIG. 5. This F-V converter 30 has a sensitivity which is twice as much as that of the F-V converter 25 of FIG. 5, and has a frequency-to-voltage conversion characteristic such that an output voltage of 0 V is produced when its input frequency is 1 MHz, and an output voltage of 0.9 V when the frequency is 1000.45 KHz. Although the embodiments of FIGS. 6 and 7 exhibit less sensitivity when compared to the embodiments of FIGS. 1 and 5, it is advantageous that the structure is simple.

From the foregoing, it will be understood since the position of the video head 5 is detected by measuring the varying oscillating frequency of the SAW oscillator 13 or SAW oscillators 13 and 15, it is possible to cause the displacement of the video head 5 in correspondence with the control voltage without being influenced by the hysteresis characteristic inherent to the bimorph element, and there are advantages that it is possible to effect all of recording, normal playback, and special playback with this video head thereby it is possible to remove video head, which has been necessary in the prior art for effecting recording and normal playback.

Moreover, since the embodiments of FIGS. 1 and 5 are constructed such that the difference in frequency between the first and second SAW oscillators 13 and 15 are used to derive the error voltage or signal, it is possible to cause the displacement of the video head in correspondence with the control voltage without being influenced by the hysteresis characteristic inherent to the bimorph element, and there are advantages that it is possible to effect displacement of the video head in correspondence with the control voltage without being influenced by change in humidity and secular change of the bimorph element.

The above-described embodiments are just examples of the present invention, and therefore, it will be apparent for those skilled in the art that many modifications and variations may be made without departing from the scope of the present invention.

What is claimed is:

1. Apparatus for controlling position of a video head, comprising:
    (a) a bimorph element having first and second piezoelectric elements, where said bimorph element is secured to a rotary cylinder of a video taype recorder and is arranged to bend, in a direction normal to the plane of rotation of said rotary cylinder, in receipt of a voltage, said video head being carried by said bimorph element to be moved together with the bending thereof;
    (b) a first set of input and output surface acoustic wave transducers provided on an exposed surface of said first piezoelectric element;

(c) a first amplifier whose input and output terminals are respectively connected to said input and output transducers on said first piezoelectric element so as to constitute a first surface acoustic wave oscillator;

(d) a second set of input and output surface acoustic wave transducers provided on an exposed surface of said second piezoelectric element;

(e) a second amplifier whose input and output terminals are respectively connected to said input and output transducers on said second piezoelectric element so as to constitute a second surface acoustic wave oscillator;

(f) first means responsive to oscillating frequency signals from said first and second surface acoustic wave oscillators for producing a frequency difference signal indicative of frequency difference between said oscillating frequency signals;

(g) second means responsive to said frequency difference signal and to a control voltage generated by said video tape recorder in accordance with a selected operating mode, for producing an error signal indicative of the difference between a desired position and an actual position of said video head, said second means comprising a frequency-to-voltage converter responsive to said frequency difference signal;

(h) third means responsive to said error signal and to said control voltage for correcting said control voltage by said error signal; and (i) fourth means responsive to an output signal from said third means for driving said bimorph element.

2. Apparatus as claimed in claim 1, wherein said first means comprises a diode mixer and a low pass filter.

3. Apparatus as claimed in claim 1, wherein said second means comprises a voltage-to-frequency converter responsive to said control voltage, a frequency converter responsive to said frequency difference signal and to an output signal from said voltage-to-frequency converter for producing another frequency difference signal which is fed to said frequency-to-voltage converter.

4. Apparatus as claimed in claim 3, wherein said frequency converter comprises a balanced modulator responsive to said frequency difference signal and to said output signal from said voltage-to-frequency converter, and a low pass filter responsive to an output signal from said balanced modulator.

5. Apparatus as claimed in claim 1, wherein said second means comprises a first subtractor responsive to said control voltage and to an output voltage from said frequency-to-voltage converter for producing a first voltage difference signal, and a second subtractor responsive to said control voltage and to said first voltage difference signal for producing a second voltage difference signal.

6. Apparatus as claimed in claim 1, wherein said third means comprises a subtractor responsive to said control voltage and to an output voltage from said frequency-to-voltage converter.

7. Apparatus as claimed in claim 1, wherein each of said transducers comprises an inter-digital structure, wherein finger pitch of said input and output transducers of said first set differs from that of said input and output transduers of said second set.

8. Apparatus for controlling position of a video head, comprising:

(a) a bimorph element having first and second piezoelectric elements, where said bimorph element is secured to a rotary cylinder of a video tape recorder and is arranged to bend, in a direction normal to the plane of rotation of said rotary cylinder, in receipt of a voltage, said video head being carried by said bimorph element to be moved together with the bending thereof;

(b) input and output surface acoustic wave transducers provided on an exposed surface of said first piezoelectric element;

(c) an amplifier whose input and output terminals are respectively connected to said input and output transducers on said first piezoelectric element so as to constitute a surface acoustic wave oscillator;

(d) first means responsive to oscillating frequency signal from said surface acoustic wave oscillator and to a control voltage generated by said video tape recorder in accordance with a selected operating mode, for producing an error signal indicative of the difference between a desired position and an actual position of said video head, said first means comprising a frequency-to-voltage converter responsive to said oscillating frequency signal from said surface acoustic wave oscillator;

(e) second means responsive to said error signal and to said control voltage for correcting said control voltage by said error signal; and (f) third means responsive to an output signal from said second means for driving said bimorph element.

9. Apparatus as claimed in claim 8, wherein said first means comprises a voltage-to-frequency converter responsive to said control voltage and a frequency converter responsive to said oscillating frequency signal from said surface acoustic wave oscillator, and to an output voltage from said voltage-to-frequency converter for producing a frequency difference signal, said frequency-to-voltage converter being responsive to said frequency difference signal.

10. Apparatus as claimed in claim 8, wherein said frequency converter comprises a diode mixer and a low pass filter.

11. Apparatus as claimed in claim 8, wherein said second means comprises a subtractor responsive to said control voltage and to said error signal.

12. Apparatus as claimed in claim 8, wherein said first and second means comprises in combination a first subtractor responsive to said control voltage and to an output voltage from said frequency-to-voltage converter for producing a first voltage difference signal, and a second subtractor responsive to said control voltage and to said first voltage difference signal for producing a second voltage difference signal.

13. Apparatus as claimed in claim 8, wherein said first and second means comprises in combination a subtractor responsive to said control voltage and to an output voltage from said frequency-to-voltage converter.

14. Apparatus as claimed in claim 8, wherein each of said transducers comprises an inter-digital structure.

* * * * *